United States Patent [19]

Shigeru et al.

[11] 4,124,283
[45] Nov. 7, 1978

[54] FADE-IN AND FADE-OUT DEVICE OF AN AUTOMATIC SERVOMECHANISM OF DIAPHRAGM IN A CINECAMERA

[75] Inventors: Yasuo Shigeru; Tomio Kurosu, both of Tokyo, Japan

[73] Assignee: Copal Company Limited, Tokyo, Japan

[21] Appl. No.: 796,596

[22] Filed: May 13, 1977

[30] Foreign Application Priority Data

May 14, 1976 [JP] Japan .................................. 51-54339

[51] Int. Cl.² ............................................. G03B 21/36
[52] U.S. Cl. ................................... 352/91 C; 352/141
[58] Field of Search ................. 352/91 R, 91 C, 91 S, 352/141

[56] References Cited

U.S. PATENT DOCUMENTS

| 3,701,594 | 10/1972 | Keiner | 352/91 S |
| 3,966,312 | 6/1976 | Wagensonner et al. | 352/91 C |
| 4,006,976 | 2/1977 | Ishiguro | 352/91 C |

*Primary Examiner*—Monroe H. Hayes
*Attorney, Agent, or Firm*—Oblon, Fisher, Spivak, McClelland & Maier

[57] ABSTRACT

A fade-in and fade-out device of an automatic servomechanism for controlling the diaphragm exposure of cinecamera. A differential amplifier having a first input voltage corresponding to the scene light and a second reference input voltage corresponding to the requisite exposure, produces a differential control voltage which is applied to the diaphragm during fade-in or fade-out. The reference input voltage to the differential amplifier is produced by an operation amplifier circuit which includes a resistive voltage divider applied to the non-inverting op-amp terminal, a negative feedback circuit formed by the parallel combination of a diode and a capacitor between the op-amp output and the op-amp inverting input, and a pair of charge and discharge resistors selectively coupled to the inverting op-amp input by means of a switch such that the reference input voltage to the differential amplifier produced at the op-amp output is linearly varied in accordance with the position of the switch, with the exposure at the midpoint of the fading-in equaling the exposure at the midpoint of the fading-out.

10 Claims, 14 Drawing Figures

FADE-IN AND FADE-OUT DEVICE OF AN AUTOMATIC SERVOMECHANISM OF DIAPHRAGM IN A CINECAMERA

BACKGROUND OF THE INVENTION

The present invention relates to a fade-in and fade-out device of an automatic servomechanism of diaphragm in a cinecamera, and, more particularly, to a fade-in and fade-out device in which the exposure in the midpoint of the time required for the fading-in and for the fading-out is made equal to each other.

The applicant has already proposed in Japanese Patent Appln. No. 82265/74 filed on July 19, 1974 a fade-in and fade-out device wherein the output voltage of a scene light indicating voltage generating circuit including a photoelectric element located behind the objective lens diaphragm or a diaphragm coupled thereto so as to receive scene light therethrough and the output voltage of a reference voltage generating circuit including a capacitor are compared with each other so that the objective lens diaphragm is actuated by the voltage differential between both output voltages until both output voltages are made equal to each other by virtue of a servomotor energized by the voltage differential being coupled with the diaphragm, the fade-in and fade-out device comprising a constant current charging circuit and a constant current discharging circuit selectively connectable to the capacitor of the reference voltage generating circuit for selectively charging and discharging the capacitor, and a switch adapted to selectively connect either of the charging or discharging circuit to the capacitor, thereby permitting the reference output voltage of the reference voltage generating circuit to be linearly varied with the lapse of time when the capacitor is selectively charged or discharged with the constant current available from the constant current charging or discharging circuit so that the exposure at the midpoint of time required for the fading-in and fading-out is made equal to each other.

In such a device, however, it is necessary to vary the value of the constant charging or discharging current of the constant current charging and discharging circuit to be charged to or discharged from the capacitor in order to vary the time of fading-in or fading-out. Such a measure is very difficult in adjustment and setting thereof.

SUMMARY OF THE INVENTION

The object of the present invention is to provide a novel and useful fade-in and fade-out device of the type described above which is simple in construction and accurate in operation and in which the time required for the fading-in and the fading-out can be set simply by the adjustment of the capacity of the capacitor and the resistance value of the resistor.

The above object is achieved in accordance with the present invention by the provision of a fade-in and fade-out device comprising a scene light indicating voltage generating circuit including a photoelectric element located behind the objective lens diaphragm or a diaphragm coupled therewith so as to receive scene light therethrough, a reference voltage generating circuit, a control circuit adapted to receive the output voltages of both the voltage generating circuits so as to control the diaphragm, the diaphragm being actuated in response to the voltage differential between the output voltages of both the voltage generating circuits until both the voltages are made equal to each other thereby achieving the proper exposure, a switch, a constant current charging circuit and a constant current discharging circuit, the charging circuit being selectively connectable to the reference voltage generating circuit by the actuation of the switch so as to raise the output voltage thereof to a predetermined value while the discharging circuit is selectively connectable to the reference voltage generating circuit by the actuation of the switch so as to lower the output voltage of the reference voltage generating circuit from the predetermined value to the output reference voltage initially set to the reference voltage generating circuit thereby permitting the fading-out and the fading-in to be effected, the fade-in and fade-out device being characterized in that the reference voltage generating circuit is constituted by a voltage dividing circuit consisting of a pair of resistors connected in series to each other, an operational amplifier having its non-inverted input terminal connected to the output terminal of the voltage dividing circuit and its output terminal connected to the control circuit, a capacitor and a diode connected in parallel to each other, the parallel circuit of the capacitor and the diode being connected between the output terminal and the inverted input terminal of the operational amplifier so as to form a negative feedback circuit thereof, and the charging circuit and the discharging circuit are constituted by resistance means selectively connectable to the inverted input terminal of the operational amplifier by the actuation of the switch thereby permitting the capacitor to be charged or discharged with a constant current so as to vary the output voltage of the operational amplifier linearly with the lapse of time so that the fading-out and the fading-in are effected with the exposure at the midpoint of the fading-in and the fading-out being made equal to each other.

As described above, since a capacitor and a diode connected in parallel thereto are provided in the negative feedback circuit of the operational amplifier and the resistance means is selectively connected to the inverted input terminal of the operational amplifier for the charging or the discharging of the capacitor thereby providing Miller integration voltage as the reference voltage for the fading-in and the fading-out, the present invention provides additionally the following advantages:

(1) The construction of the circuit is made relatively simple.
(2) The errors in the time for effecting the fading is almost limited to the allowance in the capacitor thereby permitting the range of adjustment to be narrow or the adjustment to be made easily or unnecessary.

In accordance with a further feature of the present invention, a circuit may be provided which can stop the charging of the capacitor by sensing that the output reference voltage of the operational amplifier reaches a predetermined value upon charging of the capacitor so that unnecessary or superfluous charging is avoided so that the time lag in the fading-in operation is positively avoided.

Further, an emitter follower circuit is provided which is connected to the output of the operational amplifier, so that the temperature characteristics of the diode arranged in the negative feedback circuit of the operational amplifier can be compensated for.

In accordance with a still further feature of the present invention, exposure factor such as the film sensitivity or a film feeding rate per second can be introduced in the device.

Further, the device of the present invention can be switched to manual control of the diaphragm.

In accordance with a still further feature of the present invention, indicating means is provided which indicates in various manners in which conditions the device is being actuated, i.e., whether it is in fading-out, held in faded-out condition or in fading-in, or the fading operation is completed.

Now, the preferred embodiments of the present invention will be described hereinafter with reference to the accompanying drawings.

DETAILED DESCRIPTION OF THE PREFERRED EMBODIMENTS

Figure 1:
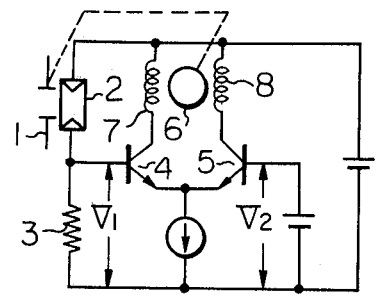
FIG. 1 is a diagram showing the fundamental circuit of the automatic servomechanism of diaphragm of the present invention.

Referring now to FIG. 1 showing the fundamental circuit of the automatic servomechanism of diaphragm of the present invention, the device comprises a scene light indicating voltage generating circuit consisting of a photoelectric element 2 located behind the objective lens diaphragm 1 or a diaphragm coupled thereto so as to receive scene light therethrough and a resistor 3 connected in series thereto, and a reference voltage generating circuit.

The output voltage $V_1$ of the scene light indicating voltage generating circuit and the output reference voltage $V_2$ of the reference voltage generating circuit are applied to a differential amplifier consisting of a transistor 4 and a transistor 5, the current flowing through each of the diaphragm opening coil 7 and the diaphragm closing coil 8 of a servomotor having a rotor 6 actuated by the coils 7, 8 and coupled with the diaphragm 1 being determined by the above mentioned voltages $V_1$ and $V_2$, respectively. When the voltage $V_1$ is different from the voltage $V_2$, the current flowing through the coil 7 is different from the current flowing through the coil 8 so that the rotor 6 is rotated in either of the opposite two directions so as to actuate the diaphragm 9 for tending both the voltages $V_1$ and $V_2$ to be equalized each other by virtue of the scene light received by the photoelectric element 2 being varied to vary the resistance value thereof. When $V_1 = V_2$ is attained, the diaphragm 1 is held in proper exposure condition of the objective lens.

Figure 2:
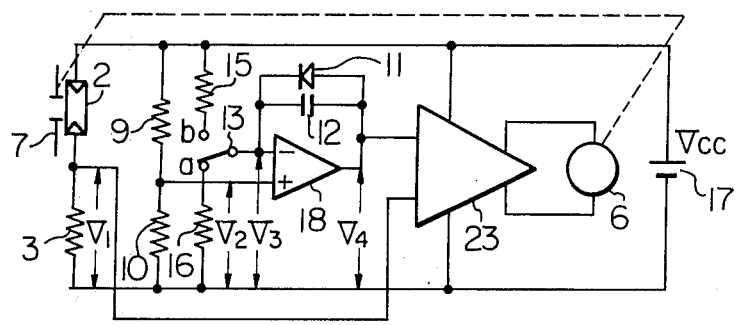
FIG. 2 is a diagram showing the first embodiment of the fade-in and fade-out device of the present invention.

FIG. 2 shows the fade-in and fade-out device of the present invention wherein the reference voltage of the reference voltage generating circuit is raised linearly with the lapse of time from the voltage $V_2$ to the source voltage or a predetermined voltage and again lowered from the source voltage or the predetermined voltage to the initially set reference voltage $V_2$ so that the resistance value of the photoelectric element 2 is varied from the value corresponding to the proper exposure to the extreme high resistance value or a predetermined high resistance value and again from the extreme high value or the predetermined high value to the resistance value corresponding to the proper exposure thereby effecting the fading-out and fading-in with the exposure at the midpoint of the time required for the fading-in and the fading-out being made equal to each other.

In FIG. 2, the scene light indicating circuit consisting of the photoelectric element 2 located behind the diaphragm 1 coupled with the rotor 6 of the servomotor and the resistor 3 connected in series to the photoelectric element 2 is energized by an electric source 17. The output voltage $V_1$ of the scene light indicating voltage generating circuit is applied to one input terminal of the servoamplifier 23.

The reference voltage generating circuit including the fading machanism of the present invention comprises a voltage dividing circuit consisting of a resistor 9 and a resistor 10 connected in series thereto and energized by the electric source 17, an operational amplifier 18 having its non-inverted input terminal connected to the output terminal of the above described voltage dividing circuit and its output terminal connected to the other input terminal of the servoamplifier 23, a capacitor 12 and a diode 11 connected in parallel to each other, the parallel connection of the capacitor 12 and the diode 11 being connected between the output terminal and the inverted input terminal of the operational amplifier 18 so as to form a negative feedback circuit thereof, a constant current charging resistor 15 with its one end connected to the plus terminal of the electric source 17, a constant current discharging resistor 16 with its one end connected to the minus terminal of the electric source 17, and a switch 13 with one end connected to the inverted input terminal of the operational amplifier 18, the other end or the movable contact of the switch 13 being adapted to selectively contact with the other end b, a of either of the charging and discharging resistors 15, 16 so as to selectively charge or discharge the capacitor 12.

The Miller integration voltage thus obtained is applied to the servoamplifier 23 as the reference voltage capable of effecting the fading operation in accordance with the present invention.

In operation, when the switch 13 is connected to the end a of the discharging resistor 16, the current flowing through the resistor 9 to the operational amplifier 18 and flowing from the inverted input terminal through the resistor 16 to the minus terminal of the electric source 17 is supplied by the diode 11 in the negative feedback circuit of the operational amplifier 18. Thus, the output terminal voltage $V_{4I}$ of the operational amplifier 18 is:

$$V_{4I} = V_2 + V_F$$

where:
$V_2$ = input terminal voltage
$V_F$ = voltage drop in forward direction of diode.

In this condition, the capacitor 12 is charged by $-V_F$.

Therefore, the voltage $V_{CI}$ of the capacitor 12 is:

$$V_{CI} = -V_F.$$

Under such conditions, the scene light indicating voltage $V_1$ of the scene light indicating voltage generating circuit including the photoelectric element 2 of the automatic servomechanism of the diaphragm drives the diaphragm 1 through the servoamplifier 23 and the rotor 6 of the servomotor so as to tend the voltage $V_1$ to be equal to the above described output terminal voltage $V_4I$ so that the proper exposure is achieved.

To effect the fading-out, the switch 13 is switched so as to contact with the end $a$ of the charging resistor 15 and disconnect the discharging resistor 16. Then, the resistor 15 is connected to the inverted input terminal of the operational amplifier 18 thereby charging the capacitor 12 with the current flowing through the charging resistor 15. In this case, since the operational amplifier 18 is subjected to negative feecback by the capacitor 12 from the output terminal to the inverted input terminal of the operational amplifier 18, the voltage at the inverted input terminal is made equal to the voltage at the non-inverted input terminal, therefore, the terminal voltage $V_{CII}$ of the capacitor 12 is:

$$V_{CII}(V_{CC} - V_2/C R_{15}) t - V_F$$

where: C = capacity of capacitor 12
$R_{15}$ = resistance value of resistor 15
$V_{CC}$ = voltage of electric source The output voltage $V_{4II}$ of the operational amplifier 18 is:

$$V_{4II} = V_2 - V_{CII} = V_2 - (V_{CC} - V_2/C R_{15}) t + V_F$$

Therefore, the voltage $V_{4II}$ is lowered linearly with the lapse of time.

During the charging of the capacitor 12, the automatic servomechanism of the diaphragm is so operated that the scene light indicating voltage $V_1$ is lowered and balanced with the decreasing voltage $V_{4II}$, thus the resistance value $R_P$ of the photoelectric element 2 is varied with the lapse of time according to following relationship:

$$V_1 = \frac{R_3}{R_P + R_3} V_{CC} = (V_2 + V_F) - \frac{V_{CC} - V_2}{C R_{15}} t$$

$$= \left\{ (K + \frac{V_F}{V_{CC}}) - \frac{1}{C} \cdot \frac{1-K}{R_{15}} t \right\} V_{CC}$$

-continued $$R_P = \left( \frac{1}{(K + \frac{V_F}{V_{CC}}) - \frac{1}{C} \cdot \frac{1-K}{R_{15}} t} - 1 \right) R_3$$

where:
$R_3$ = resistance value of resistor 3
$V_2 = K V_{CC}$

Since $V_2 = V_{CII}$, the resistance value of the photoelectric element 2 becomes the extreme high value when $V_4II = 0$, i.e., $$t = (K + \frac{V_F}{V_{CC}}) C \frac{R_{15}}{(1-K)} = T_1$$

so that the diaphragm 1 is closed to complete the fading out.

When the fading-in is to be commenced after completion of the fading-out, the switch 13 is switched so as to connect the contact $a$ and disconnect charging resistor 15 and connect the discharging resistor 16. Then, the capacitor 12 commences to be discharged through the resistor 16 and the terminal voltage $V_{CIII}$ of the capacitor 12 will be lowered linearly with the lapse of time as follows:

$$V_CIII = V_2 = \frac{V_2}{C R_{16}} t$$

where:
$R_{16}$ = resistance value of resistor 16.

At this time, the output voltage $V_4III$ will be:

$$V_{4III} = V_2 - V_{CIII} = \frac{V_2}{C R_{16}} t = \frac{1}{C} \cdot \frac{K}{R_{16}} V_{CC} \cdot t$$

Thus, the output voltage $V_{4III}$ will be raised linearly. The automatic servomechanism of the diaphragm is actuated so as to render the scene light indicating voltage $V_1$ to be made equal to the output reference voltage $V_{4III}$ of the operational amplifier 18 as in the case of the fading-out, therefore, the resistance value $R_P$ of the photoelectric element 2 will be:

$$V_1 = \frac{R_3}{R_P + R_3} V_{CC} = \frac{1}{C} \cdot \frac{K}{R_{16}} \cdot V_{CC} \cdot t = V_{4III}$$

$$R_P = ( \frac{1}{\frac{1}{C} \cdot \frac{K}{R_{16}} \cdot t} - 1) R_3$$

The terminal voltage $V_{CIII}$ of the capacitor 12 is raised until $V_{CIII} = -V_F$, and, at this point, the discharging of the capacitor 12 is stopped by the diode 11.

Thus, $$V_{4III} = V_2 + V_F = V_1$$

to restore the proper exposure.

The time required to restore the proper exposure after the commencement of the fading-in is:

$$t = (K + \frac{V_F}{V_{CC}}) C \frac{R_{16}}{K} = T_2$$

In order to render the time $T_2$ required for the fading-in to be equal to the time $T_1$ required for the fading-out, the resistance value each of the resistors $R_{15}$, $R_{16}$ is set so as to be $$\frac{R_{16}}{R_{15}} = \frac{K}{(1-K)}.$$

Figure 3:
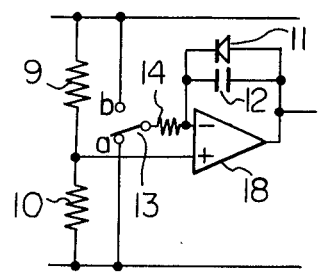
FIG. 3 is a fragmentary diagram showing a modification of the embodiment shown in FIG. 2.

When the resistance values $R_9$, $R_{10}$ of the resistor 9, 10 are made equal to each other, i.e., $$R_9 = R_{10} \therefore K = 0.5,$$

then a single common charging-discharging resistor 14 as shown in FIG. 3 can be replaced for the two charging and discharging resistors 15, 16 shown in FIG. 2.

Figure 5:
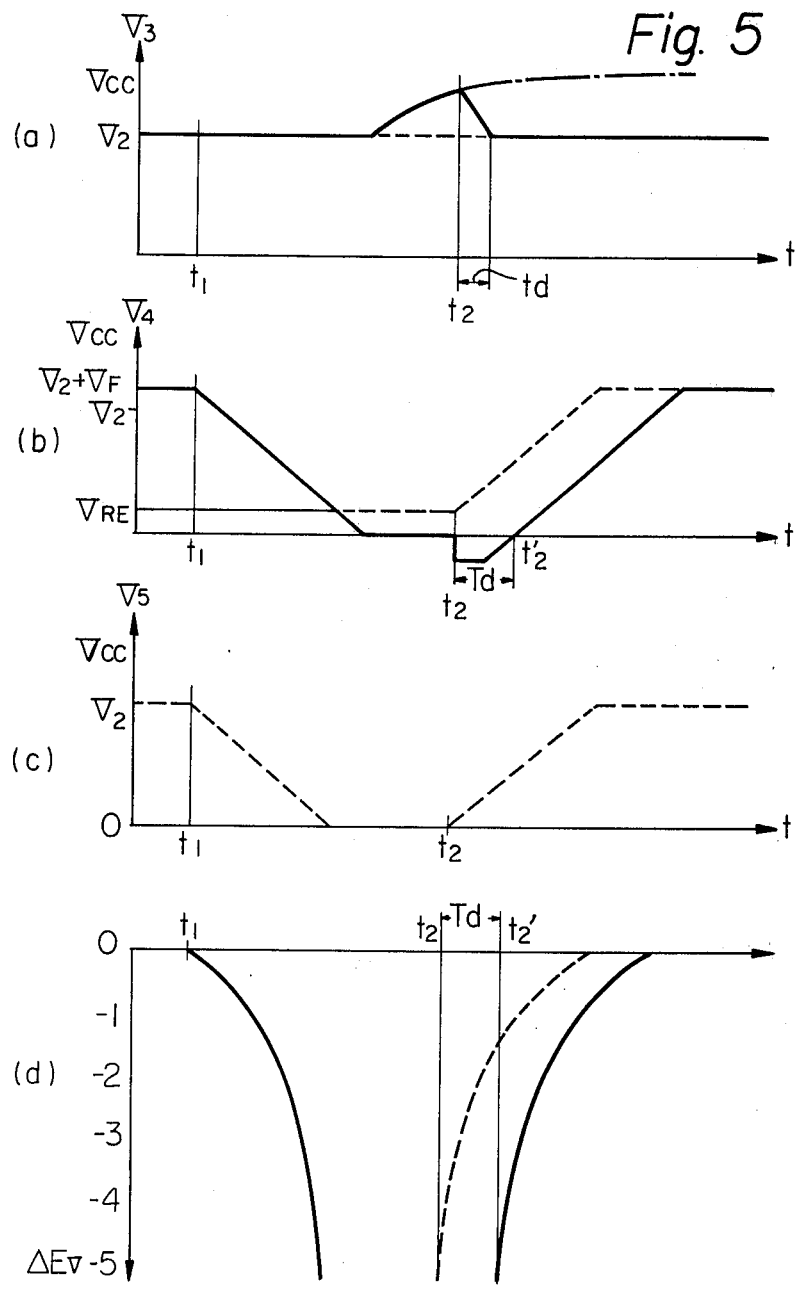
FIG. 5(a), (b), (c) and (d) shows diagrams showing the terminal voltage of the capacitor, the output voltage of the operational amplifier, the output voltage of the emitter follower transistor and the conditions of fading-out and fading-in operations of the device shown in FIG. 4, respectively.

The above described calculation applies to the case the fading-in is promptly commenced directly after the completion of the fading-out. However, if the fading-in is effected after lapse of a certain time period after the completion of the fading-out, the negative feedback control can no more be effected when the output reference voltage of the operational amplifier 18 becomes 0 at the completion of the fading-out, so that the capacitor 12 commences to be charged by the time constant C $R_{15}$, thus raising the voltage $V_3$ toward the source voltage $V_{CC}$ as shown in FIG. 5(a). Under such conditions, when the switch 13 is switched to connect the contact b so as to effect the fading-in at the time point $t_2$, the capacitor 12 is discharged by the internal resistance of the circuit, and the voltage $V_3$ is lowered and returns to the voltage $V_2$ at the time point $t_d$. Then, the negative feedback control is restored so that the output voltage $V_4$ commences to be raised following the above described equations. Therefore, the time of commencement of the fading-in is delayed to the time point $t_2'$ which is later by the time period $T_d$ from the time point $t_2$ at which the switch 13 is actuated for the fading-in as shown in FIG. 5(b), (d).

Figure 4:
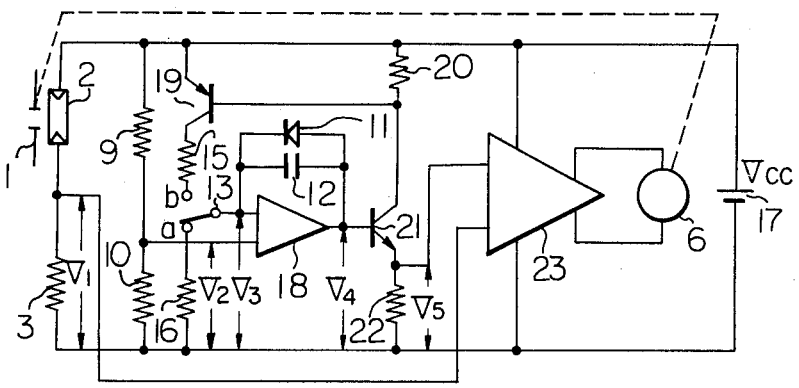
FIG. 4 is a diagram showing the embodiment of the fade-in and fade-out device of the present invention in which the time lag in the fade-in operation is avoided.

FIG. 4 shows the circuit of the fade-in and fade-out device of the present invention which avoids the above described time delay in the fading-in operation.

As shown in FIG. 4, the circuit of FIG. 4 is substantially similar to that shown in FIG. 2 except that transistors 19, 21 are provided and the collector of the transistor 19 is connected to the resistor 15 and the emitter is connected to the plus terminal of the electric source 17 while the base of the transistor 19 is connected to the junction of the collector of the transistor and one end of a resistor 20 the other end of which is connected to the plus terminal of the electric source 17. The emitter of the transistor 21 is connected to the junction of one input terminal of the servoamplifier 23 and one end of a resistor 22 the other end of which is connected to the minus terminal of the electric source, while the base of the transistor 21 is connected to the output terminal of the operational amplifier 18 thus forming an emitter follower.

In the circuit shown in FIG. 4, when the switch 13 is connected to the contact a, the proper exposure is maintained, and the output voltage $V_{4I}$ of the operational amplifier 18 is as follows as in the case of the preceding embodiment:

$$V_{4I} = V_2 + V_F$$

The capacitor 12 is held charged at the voltage $-V_F$. Thus, $$V_{CI} = -V_F$$

The voltage $V_{4I}$ is applied to the above described emitter follower transistor 21 so that the output voltage $V_{5I}$ of the transistor 21 is:

$$V_{5I} = V_{4I} - V_{BE} = V_2$$

where $V_{BE}$ is the base-emitter voltage of the transistor 21 and it is assumed that $V_{BE} = V_F$.

Under such conditions, the automatic servomechanism of the diaphragm is actuated so as to render the scene light indicating voltage $V_1$ to render the scene light indicating voltage $V_1$ to be made equal to the voltage $V_{5I}$ so as to achieve the proper exposure.

When the switch 13 is switched to connect the contact b for effecting the fading-out, the output voltage $V_{5II}$ of the emitter follower transistor 21 will be made as follows assuming that the output voltage of the operational amplifier 18 is $V_{4II}$:

$$V_{5II} = V_{4II} - V_{BE} = V_2 - \frac{1}{C} \cdot \frac{V_{CC} - V_2}{R_{15}} t$$
$$= (K - \frac{1}{C} \cdot \frac{1-K}{R_{15}} t) V_{CC}$$

The resistance value $R_P$ of the photoelectric element 2 is:

$$V_1 = \frac{R_3}{R_P + R_3} V_{CC} = (K - \frac{1}{C} \cdot \frac{1-K}{R_{15}} t) V_{CC} \neq V_{5II}$$
$$R_P = (\frac{1}{K - \frac{1}{C} \cdot \frac{1-K}{R_{15}} t} - 1) R_3$$

At the time point where $V_{4II} = V_{BE}$, i.e., $$t = K \cdot C \frac{R_{15}}{1-K} = T_1$$

the transistor 21 is rendered to be non-conductive and the voltage drop in the resistor 20 becomes 0 so that the transistor 19 is made non-conductive thereby stopping the charging of the capacitor 12 while the output voltage $V_{5II}$ of the transistor 21 is made 0. Thus, the scene light indicating voltage $V_1$ varies to follow the voltage $V_{5II}$ so that the diaphragm 1 is actuated through the servoamplifier 23 and the rotor 6 of the servomotor to raise the resistance value $R_P$ of the photoelectric element 2 to the extreme high resistance value and the diaphragm 1 is closed to complete the fading-out.

In order to commence the fading-in, the switch 13 is switched to connect the contact a and the capacitor 12 commences to be discharged through the resistor 16. The output voltage $V_{4III}$ of the operational amplifier 18 varis as follows assuming that the terminal voltage of the capacitor 12 is $V_{CIII}$:

$$V_{4III} = V_2 - V_{CIII} + V_{BE} = \frac{V_2}{C R_{16}} \cdot t + V_{BE}$$
$$= \frac{1}{C} \cdot \frac{K}{R_{16}} V_{CC} \cdot t + V_{BE}$$
$$V_{5III} = V_{4III} - V_{BE} = \frac{1}{C} \cdot \frac{K}{R_{16}} V_{CC} \cdot t$$

Therefore, the resistance value $R_P$ of the photoelectric element 2 will vary as follows:

$$V_1 = \frac{R_3}{R_P + R_3} \cdot V_{CC} = \frac{1}{C} \cdot \frac{K}{R_{16}} \cdot V_{CC} \cdot t = V_{5III}$$

-continued
$$R_P = (\frac{1}{\frac{1}{C} \cdot \frac{K}{R_{16}} \cdot t} - 1) R_3$$
$$V_{SIII} = V_2 = V_1$$

Therefore, the proper exposure is restored to complete the fading-in. The time required for completing the fading-in is:

$$t = KC\frac{R_{16}}{K} = T_2$$

As described above, the circuit of FIG. 4 positively avoids the disadvantageous surplus charging of the capacitor 12 after the fading-out, and, further, it is not affected by the electric source voltage $V_{CC}$ and the ambient temperature and provides the automatic fading operation without the disadvantageous time lag in the fading-in even though the switching of the switch for the fading-in is effected after lapse of a certain time period after the completion of the fading-out.

FIG. 5(c) is a diagram showing the output voltage of the emitter follower transistor of FIG. 4.

In accordance with the present invention, the diaphragm 1 may be held at a predetermined small aperture by about 4 to 5 EV less than the proper exposure by appropriately setting the resistance value of the resistor 20 in order to achieve the same effect of the fade-out as in the case wherein the disphragm 1 is completely closed by virtue of the fact that the human sense of vision makes it possible to have an illusion that the projected scene is felt completely dark even though the film receives very little light at the completion of the fade-out as described above.

This positively avoids the faulse function of the device caused by the delay in response of the photoelectric element 2 at the low illumination.

As described above, the time required for the fading operation can be easily adjusted by merely adjusting the capacity of the capacitor and the resistance value of the charging and discharging resistors.

Figure 6:
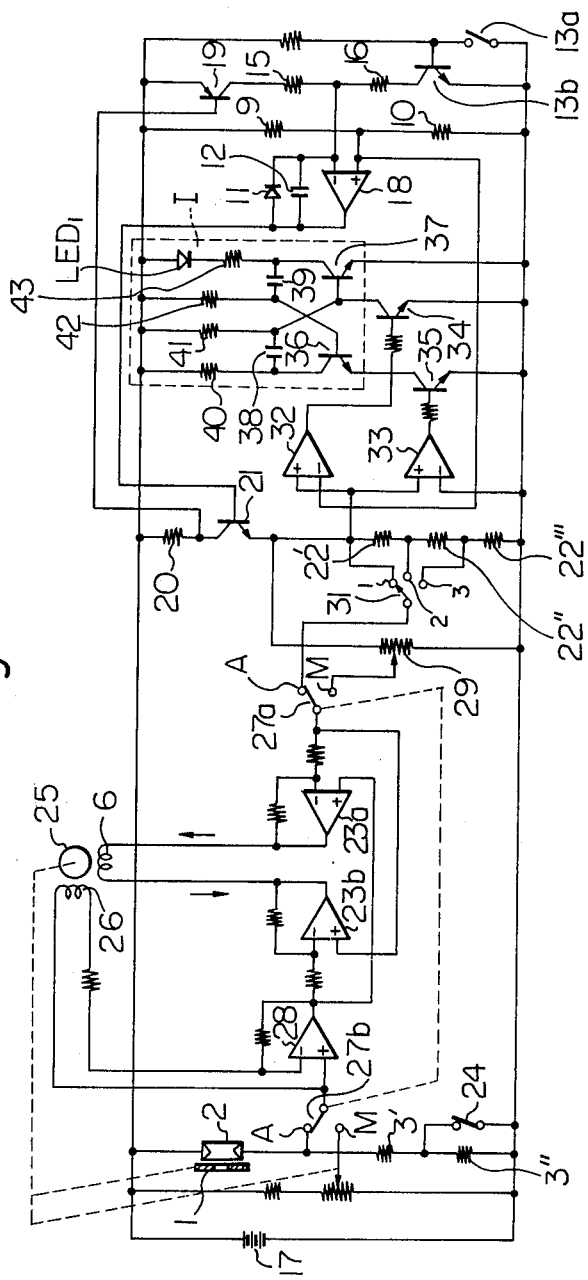
FIG. 6 is a diagram showing an embodiment of the present invention wherein exposure factors such as film sensitivity and film feeding speed can be introduced while manual control of the diaphragm is made possible and indicating device is provided to indicate the conditions of the device whether it is in fading-out, in faded-out state, in fading-in or in completed condition of the fading operation.

FIG. 6 shows an embodiment of the present invention in which the exposure factor such as the film sensitivity and the film feeding speed (48 frames/sec., 24 frames/sec., 18 frames/sec., for example) can be introduced into the device and the manual control of the diaphragm is made possible while the conditions of commencement of the fading, the advance of the fading and the completion of the fading are visually indicated in the device.

The device shown in FIG. 6 is substantially similar to that shown in FIG. 4 in construction and operation except that the above described additional features are incorporated therein.

The servoamplifier 23 shown in FIG. 4 is replaced in FIG. 6 by a pair of operational amplifiers 23a and 23b and the switch 13 in the preceding figures is replaced by a switch 13a and a transistor 13b the operation of which is similar to the switch 13.

In order to introduce the information of the film sensitivity into the device, the resistor forming the scene light indicating voltage generating circuit together with the photoelectric element 2 is divided into a plurality of resistors (two resistors shown in FIG. 6) 3' and 3" and the junction between the resistors 3', 3" is connected to the minus terminal of the electric source 17 through a switch 24 so that the resistor 3" can be selectively short-circuited. Thus, the switch 24 is selectively actuated depending upon the film loaded in the camera incorporating the circuit of FIG. 6 so that the proper exposure is obtained regardless of the change in sensitivity of the film.

In order to introduce the information of the film feeding speed, the discharging resistor 22 in FIG. 4 is replaced in FIG. 6 by a plurality of (three in FIG. 6) resistors 22'', 22'' and 22''' connected in series to each other and the junction between the transistor 21 and the resistor 22', the junction between the resistors 22' and 22'' and the junction between the resistors 22'' and 22''' are connected to the stationary contacts 1, 2, 3 of a switch 31, respectively, the movable contact of which is connected to one input terminal of the servoamplifier consisting of the operational amplifiers 23a and 23b through a switch 27a to be described later which serves to switch the device to manual control of the diaphragm 1. A switch 27b to be described later is interposed between the output terminal of the scene light indicating voltage generating circuit and another input terminal of the servoamplifier through an operational amplifier 28 having a negative feedback resistor connected between the output terminal and the inverted intput terminal of the operational amplifier 28 which serves to lower the impedance of the scene light indicating voltage generating circuit under low illumination to prevent the deterioration of the amplification degree of the servoamplifier. The switch 27b serves to switch the device to manual control of the diaphragm 1 to be described later.

Thus, when the cinecamera incorporating the device of FIG. 6 is set at 48 frames/sec. film speed, for example, the switch 31 is actuated to connect its movable contact to the stationary contact 1 with the switches 27a, 27b connected to contacts A for automatic operation to raise the input voltage to the servoamplifier to render the scene light indicating voltage to follow the increased reference voltage by the servoamplifier and the servomotor thereby enlarging the aperture of the diaphragm 1 to an aperture corresponding to the film speed of 48 frames/sec.

In the similar manner, the switch 31 is switched to connect the stationary contact 2 for effecting 24 frames/sec. film speed operation while the switch 31 is switched to connect the stationary contact 3 for the 18 frames/sec. film speed operation.

In order to switch the device to the manual control of the diaphragm 1, the switches 27a and 27b coupled with each other are switched to connect the contacts M (manual) and disconnect the contacts A (automatic).

As seen in FIG. 6, the stationary contact M of the switch 27a is connected to a potentiometer or variable resistor 29 which is manually adjustable and connected between the junction between the transistor 21 and the minus terminal of the electric source 17. This variable resistor 29 serves to manually set the desired aperture of the diaphragm 1 by adjusting the reference voltage applied to one terminal of the servoamplifier to which the scene light indicating voltage is rendered to approach by the servoamplifier and the servomotor as described previously so as to influence the aperture of the diaphragm 1 to be described below.

The stationary contact M of the switch 27b is connected to a potentiometer 30 connected between the plus and minus terminals of the electric source 17 as shown and the movable contact of the potentiometer or the variable resistor 30 is mechanically coupled with the rotor 25 of the servomotor actuated by the driving coil 6 which is energized by the servoamplifier as described previously to control the diaphragm 1. The variable resistor 30 serves to control the aperture of the diaphragm 1.

In order to manually adjust the diaphragm 1, the switches 27a, 27b are switched to connect the stationary contacts M thereof to the input terminals of the servoamplifier, and the variable resistor 29 is manually adjusted to a desired aperture of the diaphragm 1 to which the diaphragm 1 is to be set. Thus, the input reference voltage to be applied to one input terminal of the servoamplifier is adjusted to a voltage corresponding to the desired aperture of the diaphragm 1.

Since the servoamplifier is actuated to render the voltage applied to another input terminal of the servoamplifier through the variable resistor 30 to approach the reference voltage supplied from the variable resistor 29 through the servomotor and the servomotor as described previously, the diaphragm 1 is actuated by the rotor 25 of the servomotor together with the variable resistor 30 so that the diaphragm 1 is adjusted to the desired aperture at which the voltage supplied by the variable resistor 30 is balanced with the reference voltage supplied by the variable resistor 29. Thus, the manual control of the diaphragm 1 is attained by the switching of the switches 27a, 27b and the manual adjustment of the variable resistor 29.

The indicating circuit I of the fading operation shown in FIG. 6 comprises transistors 36, 37, resistors 40 to 43, capacitors 38, 39 and a light emitting diode $LED_1$ connected as shown forming a non-stable multivibrator.

The output terminals of comparators 32, 33 having their non-inverted input terminals connected the reference voltage supplied by the resistors 22'-22''' and their inverted input terminals connected to the voltage given by the voltage dividing circuuit consisting of the resistors 9, 10 and the minus terminal of the electric source 17, respectively, are connected to the transistors 37, 36 through transistors 34, 35, respectively, so as to control the indicating circuit I.

Prior to the commencement of the fading-out with the switch 13a held opened, the emitter voltage of the 21 is equal to the voltage at the non-inverted input terminal of the operational amplifier 18 and the outputs of both comparators 32, 33 are held high levels so that the transistors 34, 35 are held conductive to render the transistor 36 to be conductive while the transistor 37 is rendered to be non-conductive. Therefore, the light emitting diode $LED_1$ is held deenergized and not lighted.

Upon commencement of the fading-out by closing the switch 13a, the emitter voltage of the transistor 21 is lowered and the output of the comparator 32 is turned to be low level because the voltage at the non-inverted input terminal thereof is made lower than the voltage at the inverted input voltage thereof. As a result, the transistor 34 is turned to be non-conductive and the transistor 37 is rendered to be conductive so that the nonstable multivibrator is rendered to be in active state to commence vibration to repeatedly light and extinguish the light emitting diode $LED_1$ because the transistor 36 is held conductive thereby permitting the fading-out being effected to be indicated by the repeated lighting and extinguishing of the light emitting diode $LED_1$.

Upon completion of the fading-out, the emitter voltage of the transistor 21 is made O and both the input voltages to the comparator 33 are made the same with each other to render the output thereof to be low level so that the transistor 35 is rendered to be non-conductive. Thus, the non-stable multivibrator ceases its vibrating state due to the non-conductive state of the transistor 36 while the transistor 37 remains in the conductive state to continuingly light the light emitting diode $LED_1$ for indicating the faded-out condition of the device.

When the switch 13a is opened after the device is held in faded-out condition for a certain time period, the fading-in is commenced.

Upon opening the switch 13a, the transistor 13b is made conductive so that the voltage given by the voltage dividing circuit consisting of the resistors 15, 16 is applied to the inverted input terminal of the operational amplifier 18 to effect the negative feedback thereof so that both the inputs of the operational amplifier 18 tend to assume the same voltage by the discharging of the capacitor 12.

Thus, the terminal voltage of the capacitor 12 is lowered with the lapse of time, while the reference voltage to be given to the servoamplifier is increased to open the diaphragm 1 to again restore the proper exposure as described previously.

When the fading-in is commenced, the emitter voltage of the transistor 21 is raised so that the voltage at the non-inverted input terminal of the operational amplifier 33 is made higher than that at the inverted input terminal thereof thereby turning the output to be high level to render the transistor 35 to be conductive so as to turn the transistor 36 to be conductive. Therefore, the non-stable multivibrator is again rendered to be in active state to repeatedly light and distinguish the light emitting diode $LED_1$ thereby indicating the fading-in being effected.

Upon completion of the fading-in, wherein the increase in the input voltage to the servoamplifier ceases, both the input voltages to the comparator 32 are made equal to each other so that the output is turned to be high level so as to render the transistor 34 to be conductive and, hence, to render the transistor 37 to be non-conductive thereby extinguishing the light emitting diode $LED_1$ to indicate the completion of the fading-in.

In accordance with the present invention the time required for the fading operation is kept determined regardless of the aperture of the diaphragm.

In the embodiment shown in FIG. 6, a braking coil 26 cooperating with the rotor 25 of the servomotor for applying a braking force thereto so as to stabilize the actuation of the servomotor is connected between both the input terminals of the operational amplifier 28 together with a load resistor. This arrangement permits the braking force of the braking coil to be adjusted independently from the adjustment of the sensitivity of the servoamplifier.

Figure 7:
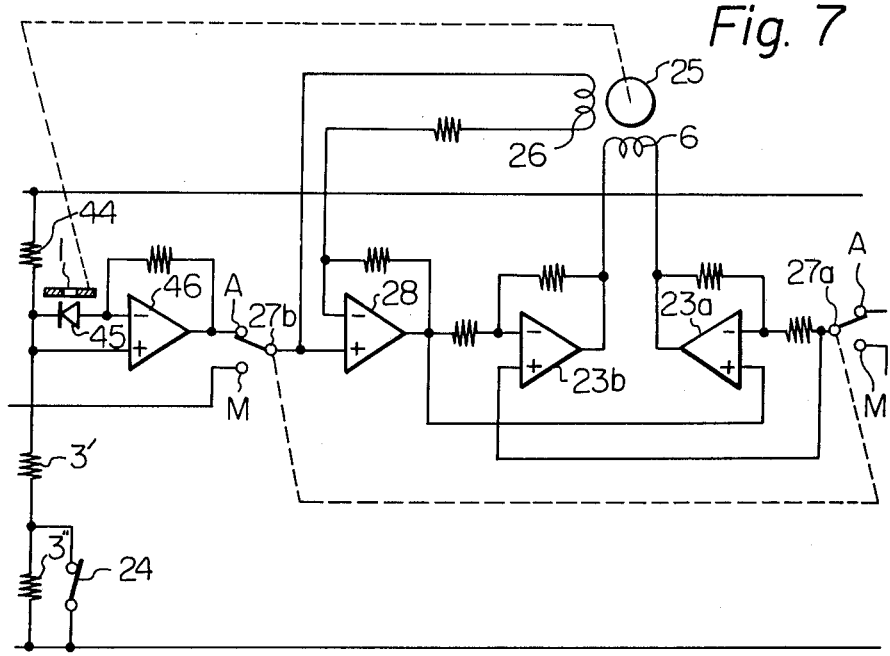
FIG. 7 is a diagram showing a modification of the embodiment of FIG. 6 in which a photogalvanic element is used in place of the photoconductive element used in the embodiment shown in FIG. 6.

In the embodiment shown in FIG. 7, a resistor 44 is replaced for the photoconductive element 2 of FIG. 6 and an operational amplifier 46 having a negative feedback resistor and a photogalvanic element 45 located behind the diaphragm 1 are provided. Forward end of the photogalvanic element 45 is connected to the junction of the resistors 44 and 3' to which the noninverted input terminal of the operational amplifier 46 is also connected, while the other end of the photogalvanic element 45 is connected to the negative feedback resistor of the operational amplifier 46 the output terminal of which is connected to the stationary contact A of the switch 27b.

The output voltage of the operational amplifier 46 is the sum of the voltage at the junction of the resistors 44 and 3' and the voltage determined by the current generated by the photogalvanic element 45 multiplied by the resistance value of the negative feedback resistor of the operational amplifier 46. This output voltage is used as the scene light indicating voltage to be applied to the servoamplifier to which the reference voltage is also applied so as to be compared with the scene light indicating voltage to drive the servomotor.

The operational amplifier 28 to which the braking coil 26 is connected may be located between the switch 27a and the input resistor of the operational amplifier 23a.

The operation of the embodiment of FIG. 7 is similar to that of FIG. 6.

FIGS. 8–11 show several modification of the indicating circuits of the present invention.

Figure 8:
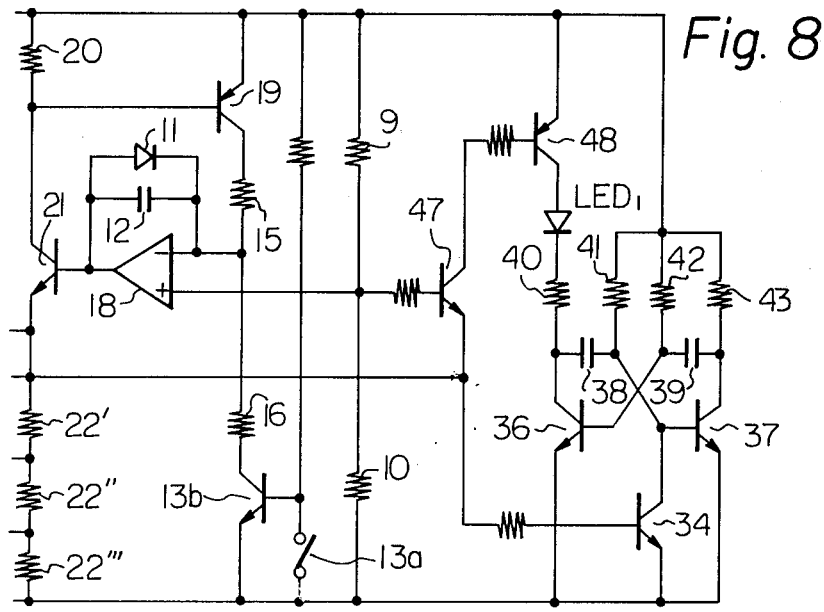
FIGS. 8 to 11 are diagrams showing various embodiments of the indicating devices of the present invention for indicating the conditions of fading operation.

In FIG. 8, the light emitting diode $LED_1$ is so actuated that it is continuingly lighted during the fading-in and fading-out while the light emitting diode $LED_1$ is repeatedly lighted and extinguished during the faded-out condition.

In the normal condition of the cinecamera for the proper exposure wherein the switch 13a is held opened, the transistor 34 is conductive and the transistor 37 is non-conductive. The voltage at the junction of the transistor 21 and the resistor 22' is held at the same voltage as the voltage appearing at the junction of the resistors 9 and 10, so that the transistor 47 is held non-conductive and the transistors 48 and 36 are non-conductive. Therefore, the light emitting diode $LED_1$ is held extinguished.

When the switch 13a is closed for the fading-out, the voltage at the junction of the transistor 21 and the resistor 22' is lowered toward O. As a result, the transistor 47 is turned to be conductive so that the transistors 48 and 36 are rendered to be conductive to continuingly light the light emitting diode $LED_1$ to indicate the condition of the fading-out.

When the voltage at the junction of the transistor 21 and the resistor 22' reaches O to complete the fading-out, the base voltage of the transistor 34 becomes the same voltage as the emitter voltage connected to the minus terminal of the electric source. Thus, the transistor 34 is rendered to be non-conductive while the transistor 37 is turned to be conductive. Therefore, the non-stable multivibrator is rendered to be active to repeatedly light and extinguish the light emitting diode $LED_1$ so as to indicate the faded-out condition.

During the fading-in, the voltage at the junction of the transistor 21 and the resistor 22' is being raised toward the voltage at the junction between the resistors 9 and 10, and the light emitting diode $LED_1$ is continuingly lighted until the former voltage reaches the latter voltage at which time the fading-in is completed while the light emitting diode $LED_1$ is extinguished to indicate the completion of the fading-in.

Figure 9:
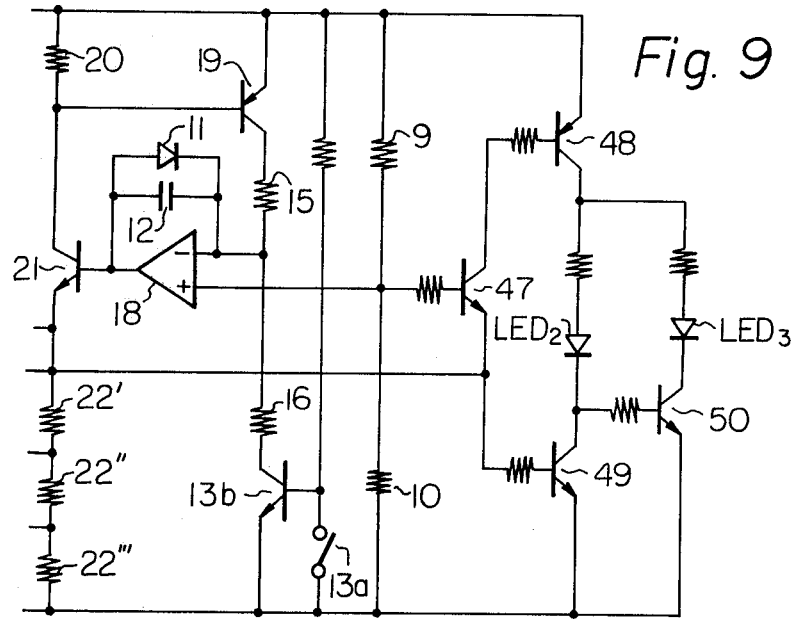

FIG. 9 shows the indicating circuit in which the fading-out and the fading-in are indicated by the continuous lighting of a light emitting diode $LED_2$ while the faded-out condition is indicated by the continuous lighting of a separate light emitting diode $LED_3$.

Under normal condition of the cinecamera for the proper exposure, the transistor 47 is non-conductive and the transistors 48, 49 and 50 are rendered to be non-conductive to extinguish the light emitting diodes $LED_2$ and $LED_3$.

During the fading-out, the voltage at the junction of the transistor 21 and the resistor 22' is lowered so that the transistors 47, 48 and 49 are turned to be conductive while the transistor 50 is held non-conductive thereby lighting only the light emitting diode $LED_2$ to indicate the fading-out being effected.

Upon completion of the fading-out, the voltage at the junction of the transistor 21 and the resistor 22' reaches O to render the transistor 49 to be non-conductive thereby extinguishing the light emitting diode $LED_2$ while the transistor 50 is rendered to be conductive to light the light emitting diode $LED_3$ thus indicating the faded-out condition.

The above operation applies to the fading-in but in reverse direction.

Figure 10:
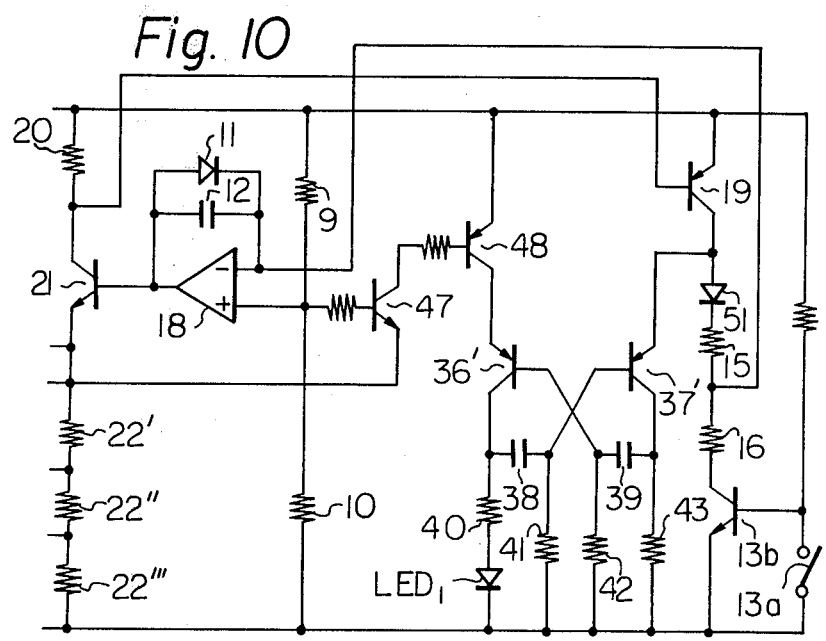

FIG. 10 shows a further modification of the indicating circuit in which the transistor 19 is used commonly as the control element of the non-stable multivibrator constituting the indicating circuit.

Under normal operation for the exposure, the transistors 19, 37' are conductive and the transistors 47, 48 and 36' are non-conductive. Thus, the light emitting diode $LED_1$ is extinguished.

Upon commencement of the fading-out, the transistors 47, 48 and 36' are rendered to be conductive to render the nonstable multivibrator to be active so that the light emitting diode $LED_1$ is repeatedly lighted and extinguished.

As the voltage at the junction of the transistor 21 and the resistor 22' decreases with the advance of the fading-out, the voltage drop in the resistor 20 decreases to raise the voltage at the junction of the resistor 20 and the transistor 21 relatively high and, at the time of completion of the fading-out, the transistor 19 is rendered to be non-conductive to render the transistor 37' to be non-conductive so as to continuingly light the light emitting diode $LED_1$ so as to indicate the faded-out condition.

Figure 11:
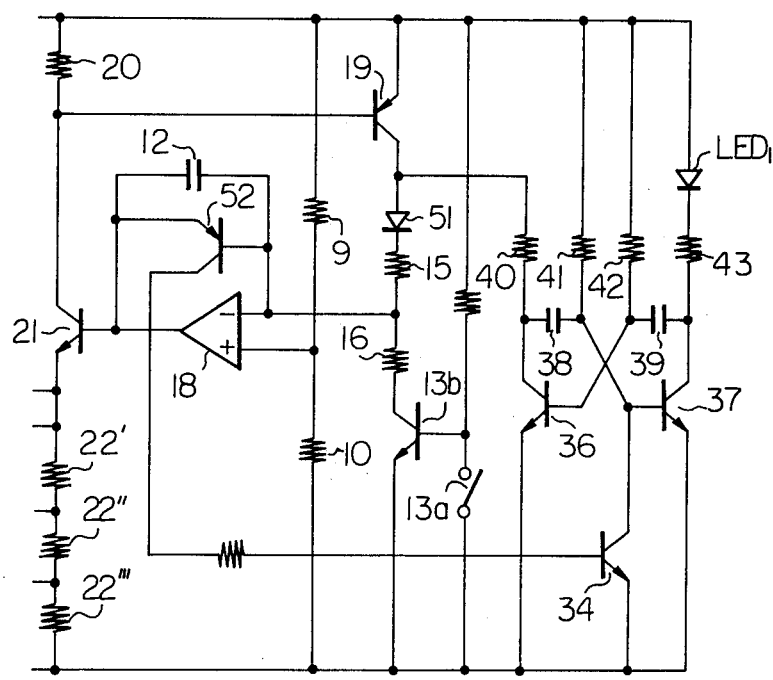

FIG. 11 shows the indicating circuit in which a transistor 52 is replaced for the diode 11 of the preceding embodiments so as to utilize the diode characteristics obtained between the emitter and the base thereof while the transistor 34 is controlled by the collector output of the transistor 52.

Under normal operation for the proper exposure, the transistor 34 is rendered to be conductive by the collector current of the transistor 52 the emitter of which the output of the operational amplifier 18 is applied, so that the transistor 37 is rendered to be non-conductive thereby extinguishing the light emitting diode $LED_1$.

Upon commencement of the fading-out, the capacitor 12 is charged by the current flowing through the resistor 15 so that a voltage is given in the reverse direction to the emitterbase of the transistor 52 so that it is rendered to be non-conductive to turn the transistor 34 to be non-conductive thereby rendering the transistor 37 to be conductive to render the non-stable multivibrator to be active. Thus, the oscillation commences to repeatedly light and extinguish the light emitting diode $LED_1$ thereby indicating the fading-out being effected.

Upon completion of the fading-out, the transistor 19 is turned to be non-conductive as in the case of FIG. 10, so that the transistor 36 is also rendered to be non-conductive to continuously light the light emitting diode $LED_1$ to indicate the faded-out condition.

We claim:

1. Fade-in and fade-out device of an automatic servomechanism of diaphragm in a cinecamera having a scene light indicating voltage generating circuit including a photoelectric element located behind the objective lens diaphragm or a diaphragm coupled therewith so as to receive scene light therethrough, a reference voltage generating circuit, a control circuit adapted to receive the output voltages of both the voltage generating circuits so as to control the diaphragm, the diaphragm being actuated in response to the voltage differential between the output voltages of both the voltage generating circuits until both the output voltages are made equal to each other thereby achieving the proper exposure, a switch, a constant current charging circuit and a constant current discharging circuit, the charging circuit being selectively connectable to the reference voltage generating circuit by the actuation of the switch so as to raise the output voltage thereof to a predetermined value while the discharging circuit is selectively connectable to the reference voltage generating circuit by the actuation of the switch so as to lower the output voltage of the reference voltage generating circuit from the predetermined value to the output reference voltage initially set to the reference voltage generating circuit thereby permitting the fading-out and the fading-in to be effected, the improvement wherein the reference voltage generating circuit is constituted by a voltage dividing circuit consisting of a pair of resistors connected in series to each other, an operational amplifier having its non-inverted input terminal connected to the output terminal of the voltage dividing circuit and its output terminal connected to the control circuit, a capacitor and a diode connected in parallel to each other, the parallel circuit of the capacitor and the diode being connected between the output terminal and the inverted input terminal of the operational amplifier so as to form a negative feedback circuit thereof, and the charging circuit and the discharging circuit are constituted by resistance means selectively connectable to the inverted input terminal of the operational amplifier by the actuation of the switch thereby permitting the capacitor to be charged or discharged with a constant current so as to vary the output voltage of the operational amplifier linearly with the lapse of time so that the fading-out and the fading-in are effected with the exposure at the midpoint of the fading-in and the fading-out being made equal to each other.

2. Device according to claim 1, further comprising a circuit for sensing the reference output voltage of the operational amplifier when it reaches a predetermined value by the charging from the electric source so as to stop the charging of the capacitor thereby avoiding surplus charging while positively preventing the delay in the commencement of the fading operation after manipulation for the fading.

3. Device according to claim 1, further comprising an emitter follower transistor circuit connected to the output of the operational amplifier, thereby permitting the temperature characteristics of the diode connected in the negative feedback circuit of the operational amplifier to be compensated for.

4. Device according to claim 1, wherein the resistor forming the scene light indicating voltage generating circuit together with the photoelectric element comprises a plurality of resistors connected in series to each other and switch means is provided for selectively shortcircuiting some of the plurality of resistors, thereby permitting exposure factor such as the sensitivity of film loaded in the cinecamera to be introduced in the device for the proper exposure.

5. Device according to claim 1, further comprising resistor means connected to the output of the reference voltage generating circuit for setting the voltage to be applied to the control circuit to either of a plurality of predetermined voltages, and switch means connected between the resistor means and the control circuit so as to apply a selected voltage of the plurality of predetermined voltages to the control circuit by the actuation of the switch means thereby permitting exposure factor such as the film feeding speed of the cinecamera to be introduced in the device for the proper exposure.

6. Device according to claim 1, further comprising a first variable resistor connected to the electric source to provide a variable output voltage, the first variable resistor being manually adjustable, a second variable resistor connected to the electric source to provide a variable output voltage, the second variable resistor being coupled with the control circuit for controlling the diaphragm thereby permitting the output voltage of the second variable resistor to be varied in response to the actuation of the control circuit, a first switch selectively connecting the output of the reference voltage generating circuit or the output of the first variable resistor to the control circuit, and a second switch selectively connecting the output of the scene light indicating voltage generating circuit or the output of the second variable resistor, the first and the second switch being coupled with each other so as to simultaneously switch the connection to the voltage generating circuits or to the variable resistors, thereby permitting the diaphragm to be manually controlled by switching the first and the second switch to connect the variable resistors and setting the first variable resistor to provide a voltage corresponding to the desired aperture of the diaphragm.

7. Device according to claim 1, further comprising an indicating circuit for indicating the commencement of the fading operation and the faded-out condition, the indicating circuit including a non-stable multivibrator and at least a light emitting diode, the non-stable multivibrator being actuated depending upon the condition of fading operation so as to energize the light emitting diode in various manners so as to indicate the conditions of the fading operation distinctively from each other.

8. Device according to claim 7, wherein a single light emitting diode is provided and the light emitting diode is repeatedly lighted and extinguished during the time the fading is being effected by the actuation of the non-stable multivibrator while the light emitting diode is continuously lighted under the fadeout condition.

9. Decice according to claim 7, wherein a single light emitting diode is provided and the light emitting diode is continuously lighted during the time the fading operation is being effected while the light emitting diode is repeatedly lighted and extinguished under the faded-out condition by the actuation of the non-stable multivibrator.

10. Device according to claim 7, wherein two light emitting diodes are provided and one of the light emitting diodes is continuously lighted during the time the fading operation is being effected while the other light emitting diode is continuously lighted under the faded-out condition.

* * * * *